(12) United States Patent
Johnson et al.

(10) Patent No.: US 7,370,730 B2
(45) Date of Patent: May 13, 2008

(54) SELF-CHECKOUT SYSTEM WITH PLURALITY OF CAPACITY-DETECTING LOADING STATIONS

(75) Inventors: Michael J. Johnson, Raleigh, NC (US); Jessica King Snead, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/174,913

(22) Filed: Jul. 5, 2005

(65) Prior Publication Data

US 2007/0007078 A1    Jan. 11, 2007

(51) Int. Cl.
*G07C 11/00* (2006.01)
(52) U.S. Cl. .......................................... 186/59; 177/50
(58) Field of Classification Search ................. 186/61, 186/52, 59; 177/50, 25.11, 58, 199; 235/124; 700/305; 705/23, 414, FOR. 105
See application file for complete search history.

(56) References Cited

U.S. PATENT DOCUMENTS

| | | | | |
|---|---|---|---|---|
| 4,779,706 | A | * | 10/1988 | Mergenthaler ................ 186/61 |
| 5,083,638 | A | * | 1/1992 | Schneider ..................... 186/61 |
| 5,313,766 | A | * | 5/1994 | Rimondi et al. ............... 53/451 |
| 5,967,264 | A | | 10/1999 | Lutz et al. |
| 6,394,345 | B1 | * | 5/2002 | Dejaeger et al. ............. 235/383 |
| 6,491,218 | B2 | | 12/2002 | Nguyen |
| 6,550,583 | B1 | * | 4/2003 | Brenhouse ..................... 186/66 |
| 6,857,505 | B1 | * | 2/2005 | Mason et al. .................. 186/59 |
| 7,034,679 | B2 | * | 4/2006 | Flynn ........................... 340/540 |
| 7,044,370 | B2 | * | 5/2006 | Bellis et al. ................ 235/383 |
| 2003/0024982 | A1 | | 2/2003 | Bellis, Jr. et al. |
| 2003/0052166 | A1 | | 3/2003 | Nguyen |

* cited by examiner

*Primary Examiner*—Patrick Mackey
*Assistant Examiner*—Mark J. Beauchaine
(74) *Attorney, Agent, or Firm*—Jeanine Ray-Yarletts, Esq.; Steven M. Greenberg, Esq.; Carey Rodriguez Greenberg & Paul LLP

(57) ABSTRACT

A system and method for scanning goods and loading the goods into receptacles by a user includes a scanner and a plurality of loading stations. The scanner scans the goods, and the scanned goods are placed on the loading stations. Each loading station separately obtains a weight of the goods within each respective loading station. In response to each of the weights obtained by all of the plurality of loading stations exceeding a predetermined first weight, the self-checkout system is configured to initiate a first alarm detectable by the user, and in response to the first alarm being initiated, the self-checkout system is configured to prevent additional goods from being scanned by the scanner. In response to each of the weights obtained by all of the plurality of loading stations being below or substantially at a predetermined second weight, the self-checkout system is configured to allow additional goods to be scanned by the scanner after the first alarm is initiated. A computer program product to operate the system is also included.

5 Claims, 2 Drawing Sheets

SELF-CHECKOUT SYSTEM WITH PLURALITY OF CAPACITY-DETECTING LOADING STATIONS

BACKGROUND OF THE INVENTION

1. Field of the Invention

The disclosure relates generally to checkout systems and, more specifically, to a self-checkout system that enables a user to scan goods and subsequently bag the goods in loading stations.

2. Description of the Related Art

Many register checkout stations, which have been a standard feature in grocery stores, home improvement stores, and other retailers, have been replaced by self-checkout stations. The self-checkout stations reduce expenses for the retailers while offering convenience and time savings to customers. While retailers encourage the use of these self-checkout stations, the retailers recognize the need to provide safeguards against theft and customer error.

A commonly employed safeguard used in current self-checkout stations employs the use of weight verification. For example, upon scanning a particular item/good, the customer is required to immediately place the item into a bag that is positioned on a weighed station or carousel. The actual weight of the item may be compared to a stored weight to determine if the correct item was placed in the bag. Also, if any of the items within the bag, station, or carousel are removed prior to the transaction being completed (e.g., the customer paying for the goods), the system initiates an audible or visual alarm that allows a sales associate with the retailer to immediately determine if the customer is having a problem or is attempting to take the items without paying for them. The alarm, although effective in deterring theft, also causes embarrassment to those customers that mistakenly activate the alarm.

A problem with certain of these self-checkout systems is that they have limited capacity to receive and weigh items. When a customer has more items than can be placed in the weighing station, the customer may prematurely remove the items, which cause the alarm to be initiated. The type of customer that purchases more items than can be placed in the weighing station is the "big ticket" type of customer that retailers want to encourage to return. However, this is also the same type of customer that may inadvertently remove items from the weighing station and be embarrassed by the initiation of the alarm.

To prevent such an occurrence, some current self-checkout systems include a weighed conveyor belt instead of a weighed station or carousel. This increases the transaction capacity since the goods are immediately conveyed to a larger bagging station instead of a smaller-capacity station. This type of system, however, introduces additional problems. For example, the conveyor belt takes up more floor space than a carousel or stationary weighing station. Also, the conveyor itself, with its belts, motors, etc., creates a greater initial expense and more maintenance for the retailer.

BRIEF SUMMARY OF THE INVENTION

Embodiments of the invention address deficiencies of the art in respect to self-checkout systems and provide a novel and non-obvious method, system and apparatus for scanning goods and loading the goods into receptacles. In this regard, the self-checkout system includes a scanner and a plurality of loading stations. The scanner scans the goods, and the scanned goods are placed on the loading stations. Each loading station separately obtains a weight of the goods within each respective loading station. In response to each of the weights obtained by all of the plurality of loading stations exceeding a predetermined first weight, the self-checkout system is configured to initiate a first alarm detectable by the user, and in response to the first alarm being initiated, the self-checkout system is configured to prevent additional goods from being scanned by the scanner.

After the first alarm is initiated, in response to each of the weights obtained by all of the plurality of loading stations being below a predetermined second weight, the self-checkout system is configured to again allow additional goods to be scanned by the scanner. The self-checkout system is configured to initiate a second alarm detectable by the user if each of the weights obtained by all of the plurality of loading stations are not below or substantially at a predetermined second weight after a predetermined first period of time after initiation of the first alarm. The second alarm prompts the user for an input into the self-checkout system.

After the second alarm is initiated, the self-checkout system is configured to initiate a third alarm detectable by a central system or by a sales associate of the retailer if no user input has been received in response to the second alarm after a predetermined second period of time after initiation of the second alarm, if each of the weights obtained by all of the plurality of loading stations are still not below or substantially at the predetermined second weight after the predetermined second period of time after initiation of the first alarm.

In certain aspects, the self-checkout system also includes a carousel upon which the plurality of loading stations are disposed. The loading station includes a support configured to receive a freely-hanging receptacle, and the support is configured to weigh the freely-hanging receptacle. In another aspect, the loading station includes a base upon which a receptacle is placed, and the base is configured to weigh a receptacle placed upon the base. In yet another aspect, the loading station includes a support upon which a receptacle hangs and a base, and the base is configured to weigh the receptacle.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE INVENTION

Figure 1:
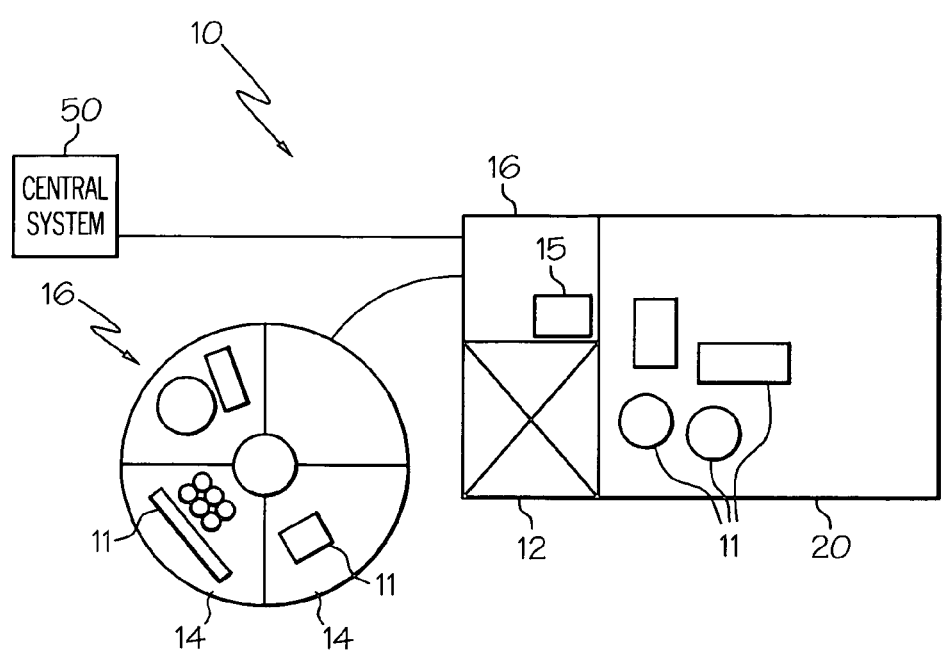
FIG. 1 is a schematic illustration of a self-checkout system in accordance with the inventive arrangements.

FIG. 1 illustrates a self-checkout system 10 for scanning goods 11 and loading goods 11 into receptacles by a user. The self-checkout system 10 includes a scanner 12 and a plurality of loading stations 14. The scanner 12 scans the goods 11, and the scanned goods 11 are placed on the loading stations 14. Each loading station is separately capable of obtaining the weight of goods 11 placed in the individual loading stations 14. The self-checkout system also includes a computer system 15 that is connected to the scanner 12 and loading stations 14. The self-checkout system 10 may also include an input/output device 16 for receiving input from the user and/or providing the user with information/instructions.

The computer system 15 controls the operation of the scanner and receives the weights obtained by the loading stations 14. The self-checkout system is not limited to a particular type of computer system 15 or where the computer 15 system is located. For example, the computer system 15 or portions thereof may be located remote from the scanner 12 and loading stations 14 and/or portions of the computer system 15 may be included within the scanner 12 and/or loading stations 14. For purposes of discussion, the computer system 15 is considered to be part of the input/output device 16.

Many types of input/output devices 16 are known to be capable of being used use in self-checkout systems, and the present self-checkout system 10 is not limited as to a particular type of input/output devices 16. For example, the input/output device 16 may be separate devices, such as a keypad and a video display, or the input/output device 16 may be combined into a single unit such as a video touchpad.

The self-checkout system 10 is also not limited as to a particular type loading station 14. For example, each loading station 14 can be included within a rotating carousel 16. Alternatively, each loading station 14 may be in a fixed position relative to the scanner 12.

Figures 2A, 2B, 2C:
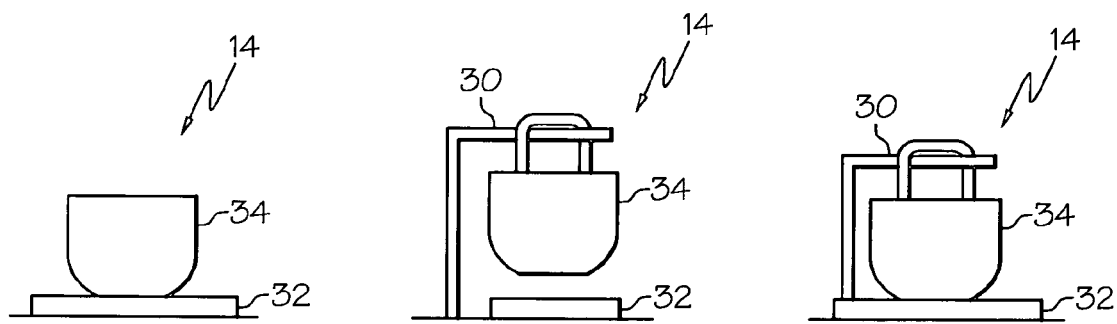
FIGS. 2A-2C are schematic illustrations of alternative loading stations of the self-checkout station.

The manner in which each loading station 14 weighs goods within the loading station 14 is also not limited. FIGS. 2A-2C illustrate several configurations of a loading stations 14 that may be used to weigh goods within the loading station 14. In FIG. 2A, a base 32 of the loading station 14 includes a scale that determines a weight of goods 11 placed upon the base 32 (as shown, the goods 11 are placed within a receptacle 34, such as a bag). In FIGS. 2B and 2C, the receptacle 34 is hung from a support 30 included within the loading station 14.

In FIG. 2B, in situations where the receptacle 34 is freely hung (as shown), the weight of the goods 11 can be determined, for example, by measuring the amount of deflection of the support 30 caused by the receptacle 34. A scale may also be included in the base 32, to account for the receptacle partially or fully resting upon the base 32 and/or goods 11 being placed directly on the base 32. In such a configuration, the weights determined by both the support 30 and base 32 can be added together to obtain a total weight.

In FIG. 2C, the support 30 is placed directly on the base 32, and the base 32 includes a scale. In this configuration, regardless of the goods 11 being placed in a receptacle 34 hanging from the support 30, goods 11 being placed directly on the base 32, and/or the receptacle 34 partially or fully resting upon the base 32, the scale within the base 32 is capable of measuring the total weight of the goods 11 within the loading station 14.

Figure 3:
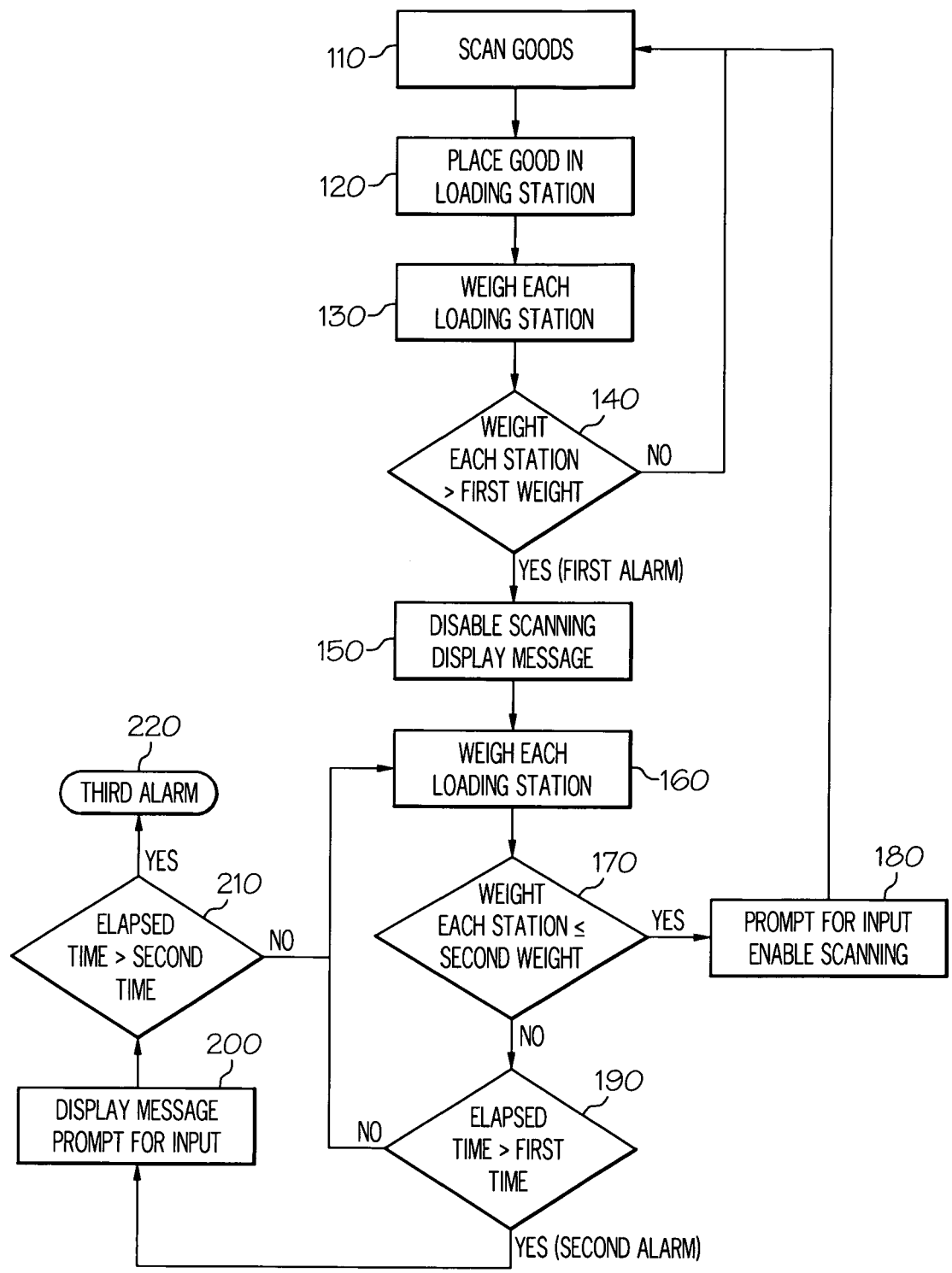
FIG. 3 is a flow chart illustrating a process for scanning goods and loading goods onto loading stations using the self-checkout system.

In FIG. 3 illustrates a method in which the self-checkout system 10 is operated. At any point in the process after a first good 11 has been scanned, the user is capable of stopping the processing and completing the transaction. In step 110, goods 11 are taken from a staging area 20 and scanned with the scanner 12 by a user. After the good 11 has been scanned, in step 120, the good 11 is placed into one of the loading stations 14. In step 130, a weight of the goods 11 in each loading station 14 is obtained, and in step 140, all of the obtained weights are compared to a first predetermined weight.

The first predetermined weight may be selected to approximate the weight of goods 11 in a single loading station 14 upon the single loading station being considered full. If all of the obtained weights are greater than the first predetermined weight, then the loading stations 14 are considered as being full by the self-checkout system 10, and the process moves to step 150. Otherwise, goods 11 may continue to be scanned.

Upon a determination that all of the loading stations 14 are full, in step 150, the scanner 12 is disabled, and the self-checkout system 10 initiates a first alarm detectable by the user using, for example, the input/output device 16. The first alarm directs the user to remove all of the goods 11 from the loading stations 14. The first alarm is not limited in the manner in which the alarm attracts the user's attention. Examples of the alarm include an audible alarm and/or a visible alarm.

After the first alarm has been initiated, in 160, a weight of the goods 11 in each loading station 14 is obtained, and in step 170, all of the obtained weights are compared to a first predetermined weight. The second predetermined weight may be selected to approximate a value that equates to an empty loading station 14. If all or a predetermined number of the loading stations 14 return a second predetermine weight that equates to an empty loading station 14, then, in step 180, the scanner 12 is enabled and the user may continue to scan goods 11. Prior to enabling the scanner 12, the self-checkout system 10 may require an input from the user to acknowledge that goods 11 have been removed from the loading stations 14.

Otherwise, in step 190, the self-checkout system 10 determines the amount of time that has elapsed since the first alarm and initiates a second alarm detectable by the user if the elapsed amount of time exceeds a first predetermined period of time and no change occurs in the measured weights of the goods 11. Similar to the first alarm, the second alarm is not limited in the manner in which the alarm attracts the user's attention. In step 200, the second alarm prompts the user to clear the goods 11 from the loading stations 14 or to complete the transaction. The second alarm may also prompt the user for an input to provide the user with additional time to remove the goods 11 from the loading stations 14 or to complete the transaction.

If, in step 210, after a second predetermined period of time after initiation of the first alarm and no change occurs in the measured weights of the goods 11, no user input has been received in response to the second alarm, and/or no additional activity by the user has been detected by the self-checkout system, a third alarm may be initiated in step 220. The third alarm may include a communication from the self-checkout system 10 to a central system 50 that monitors one or more self-checkout systems 10, to a sales associate of the retailer, or to another type of employee of the retailer. The communication to the central system may also occur after the second alarm has been initiated and may serve as a notice that user has abandoned the transaction without completing payment.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

What is claimed is:

1. A method for scanning goods and loading the goods into receptacles by a user using a self-checkout system, comprising the steps of:
   scanning the goods with a scanner;
   placing the scanned goods into one of a plurality of loading stations;
   separately obtaining a weight from each of the plurality of loading station;
   individually comparing each of the weights obtained by all of the plurality of loading stations to a predetermined first weight; and
   initiating a first alarm detectable by the user in response to each of the weights obtained by all of the plurality of loading stations individually exceeding the predetermined first weight.

2. The method according to claim 1, further comprising preventing additional goods from being scanned by the scanner in response to the first alarm being initiated.

3. The method according to claim 2, further comprising allowing additional goods to be scanned by the scanner after the first alarm being initiated in response to each of the weights obtained by all of the plurality of loading stations being below or substantially at a predetermined second weight.

4. The method according to claim 2, further comprising initiating a second alarm detectable by the user if each of the weights obtained by all of the plurality of loading stations not being below or substantially at a predetermined second weight after a predetermined period of time after initiation of the first alarm.

5. The method according to claim 4, further comprising prompting the user for an input into the self-checkout system in response to the second alarm being initiated.

* * * * *